United States Patent [19]

Villata

[11] Patent Number: 4,993,531

[45] Date of Patent: Feb. 19, 1991

[54] FRICTION PAD CARRIER DISC, IN PARTICULAR FOR AN AUTOMOTIVE VEHICLE CLUTCH

[75] Inventor: Gino Villata, Buttigliera D'Asti, Italy

[73] Assignee: Valeo, Paris, France

[21] Appl. No.: 442,310

[22] Filed: Nov. 28, 1989

[30] Foreign Application Priority Data

Nov. 29, 1988 [FR] France .................. 88 15562

[51] Int. Cl.⁵ .............................................. F16D 13/60
[52] U.S. Cl. ............................... 192/107 C; 192/107 R
[58] Field of Search ....................... 192/107 C, 107 R

[56] References Cited

U.S. PATENT DOCUMENTS

| | | | |
|---|---|---|---|
| 1,949,385 | 2/1934 | Fadely | 192/107 C |
| 1,971,665 | 8/1934 | Tower | 192/107 C |
| 2,256,712 | 9/1941 | Hunt | 192/107 C |
| 2,327,884 | 8/1943 | Goodwin | 192/107 C |
| 4,108,699 | 8/1978 | deGennes | 192/107 C |
| 4,278,162 | 7/1981 | Frichette et al. | 192/107 C |

FOREIGN PATENT DOCUMENTS

| | | |
|---|---|---|
| 272328 | 6/1988 | European Pat. Off. |
| 962219 | 4/1957 | Fed. Rep. of Germany ... 192/107 C |
| 877597 | 12/1942 | France |
| 2370893 | 3/1979 | France |
| 1591949 | of 0000 | United Kingdom |

Primary Examiner—Rodney H. Bonck
Assistant Examiner—Andrea Pitts
Attorney, Agent, or Firm—Charles E. Brown; Charles A. Brown

[57] ABSTRACT

The present invention is concerned with a carrier disc for clutch friction pads comprising a central portion and radial blades. Each blade is joined individually to the central portion by a generally radial blade foot, and is cantilevered asymmetrically from either side of this foot. Each blade is divided into zones by transverse shoulders. For a given diameter, the terminal zone of that portion of the blade that is cantilevered to the greatest extent with respect to the blade foot, and which is intersected by the endmost shoulder, is joined to the central zone by a second foot.

7 Claims, 1 Drawing Sheet

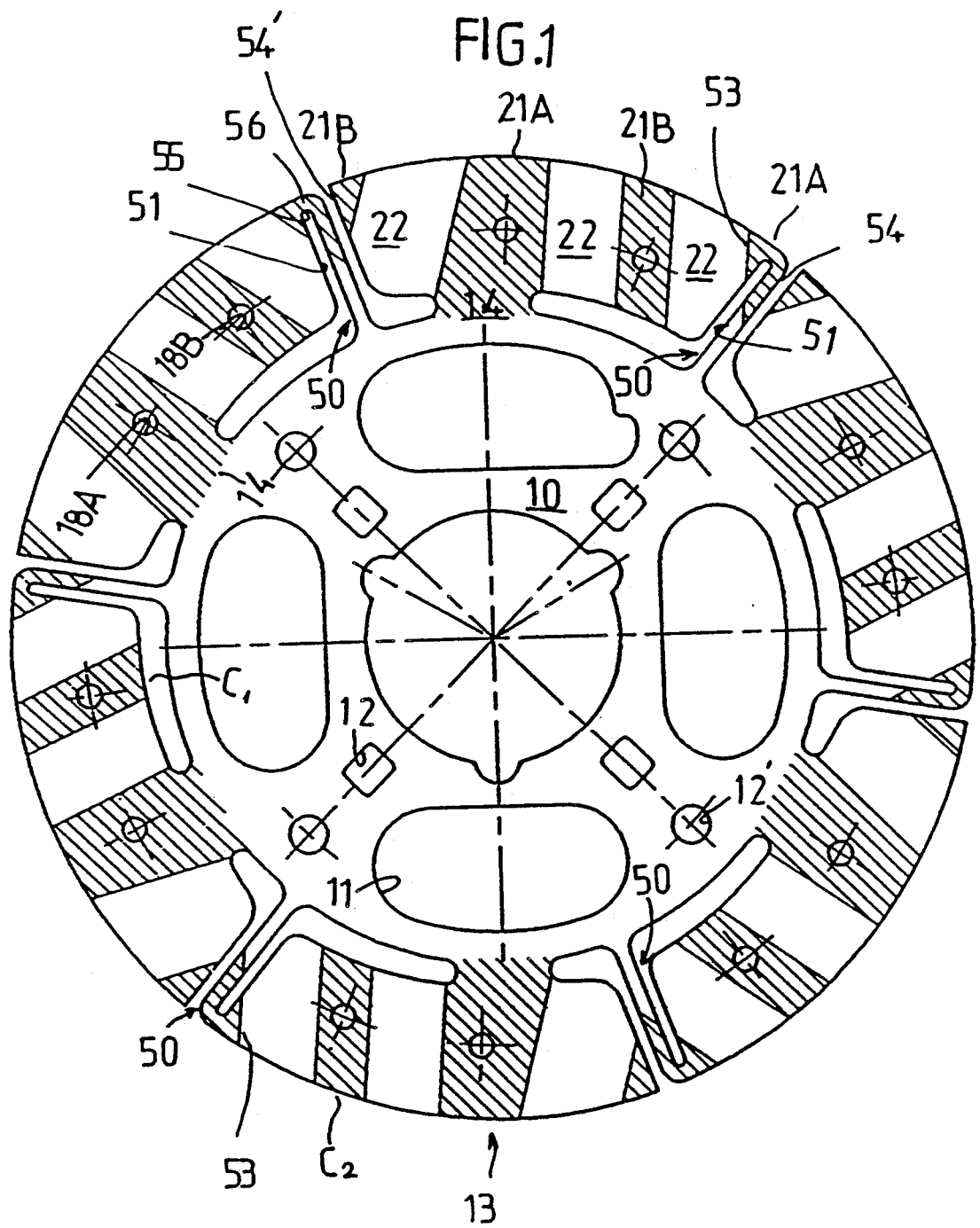

FRICTION PAD CARRIER DISC, IN PARTICULAR FOR AN AUTOMOTIVE VEHICLE CLUTCH

FIELD OF THE INVENTION

The present invention is concerned with a friction pad carrier disc, for use as a component of a disc-type friction clutch, in particular for automotive vehicles, of the kind comprising a central portion which is generally continuous circumferentially, and a peripheral portion divided into radial blades for carrying friction pads, each of the blades being joined individually to the central portion through a generally radial blade foot and being cantilevered circumferentially in a non-symmetrical manner on either side of the blade foot, with transverse shoulders delimiting on the blade a plurality of pad-carrying zones, which are generally parallel to the mean plane of the central portion, and junction zones alternating with the carrying zones and generally offset obliquely with respect to the plane.

BACKGROUND OF THE INVENTION

Such a disc is described in the patent document FR 2 370 893B (corresponding to United Kingdom published patent application No. GB 1 591 949A), and thus has some axial resilience in the vicinity of its blades when the friction pads come into engagement.

In FIGS. 6 to 9 of that document, each blade is asymmetrical, and one of its endmost shoulders intersects its circumferential edge furthest from the blade foot. For a given blade diameter, the terminal zone furthest from the blade foot may be either a junction zone or a carrying zone. Having regard to this arrangement, ruptures are sometimes to be found in the vicinity of the blade foot and/or of the zone, in particular under the action of centrifugal force, with the rupture leading to similar rupture of the friction pads.

SUMMARY OF THE INVENTION

An object of the present invention is to overcome these disadvantages without necessitating any great modification of the tooling, while the benefits of good axial resilience in the region of the blades when the friction pads are engaged are preserved.

According to the invention, a disc of the type indicated above is characterised in that, for a circumference corresponding to a given diameter, the terminal zone of that portion of the blade which is cantilevered to the greatest extent with respect to the blade foot, and which is intersected by the endmost shoulder, is joined to the central portion by a reinforcing foot.

Due to the arrangement provided by the invention, the robustness of the friction pad carrier disc is increased, as is the length of its life. It will also be appreciated that the friction pads are preserved, and that the friction pad carrier disc is able to rotate at higher speed, whicle the benefits of good axial resilience in the region of the blades when the friction pads are engaged are preserved.

Preferably, the second foot has a radial length which is greater than that of the blade foot, and comprises a thin strip of material allowing good flexibility of the blades to be preserved, without significantly increasing the moment of inertia.

In accordance with one embodiment, the reinforcing foot is delimited by a slot closed at its outer end and intersecting the terminal zone, and the second foot is located in the space which is available between two successive blades.

The following description illustrates the invention, by way of example, with reference to the single annexed drawing.

BRIEF DESCRIPTION OF THE DRAWING

The drawing is a view in elevation of a friction pad carrier disc according to the invention.

DESCRIPTION OF PREFERRED EMBODIMENTS

The drawing shows a carrier disc for friction pads suitable as a component of a disc-type friction clutch, in particular a clutch for an automotive vehicle. It comprises a flat, annular, central portion 10, which is generally circular and continuous, and which has various through openings 11 and holes 12, 12', for the purposes, respectively, of mounting circumferentially acting springs and accommodating friction ring lugs and rivets for fastening the friction disc to the guide rings (not shown). This disc carries friction pads which are disposted on either side of the latter (see FIG. 2 of United Kingdom published patent application No. GB 1 591 949A). As so far described, it is conventional.

It includes a peripheral portion divided into radial blades 13, each of which is individually joined to the central portion 10 by a generally radial blade foot 14, and each of which extends in a non-symmetrical manner so as to be cantilevered circumferentially to each side of such a foot 14. Each blade 13 extends generally between, on the one hand, two circumferences C1, C2, representing its circumferential edge having the smallest and largest diameters, respectively, and on the other hand two transverse edges 54, 54' which in this example extend generally radially.

Each blade 13 is formed with shoulders delimiting, circumferentially on the blade, friction pad carrying zones 21A, 21B, generally parallel to the mean plane of the central portion 10, for alternate contact with the respective friction pads, and junction zones 22 alternating with the zones 21A, 21B, the zones 22 being generally offset obliquely with respect to the plane, and the zones 21B being offset axially with respect to the zones 21A.

There are thus, on a first side of one carrying zone 21A disposed an an extension of the flat central portion 10, a first offset junction zone 22, a carrying zone 21B, a second offset junction zone 22, and a terminal carrying zone 21A which is delimited by the endmost shoulder 53, i.e. that furthest from the foot 14, and which is only effectively active along the circumference C2. It is this portion of the blade that has the greatest circumferential length. It will be noted that for a circumference defined by a smaller diameter, the terminal zone intersected by the shoulder 53 may be the junction zone 22.

On the other side of the carrying zone 21A that constitutes an extension of the central portion 10, there are, successively, an offset junction zone 22 and a carrying zone 21B which is only effectively active along the circumference C2. Thus, in accordance with the feature which is described in the above mentioned patent FR 2 370 893B (GB 1 591 949A), the number of carrying zones in one blade which are effectively active along the circumferential edge of greatest diameter in that blade, is larger than the number of carrying zones that are effectively active along its circumferential edge having the smallest diameter.

It will be noted that the endmost zones 21A, 21B of the two cantilevered portions of the blade 13 extend obliquely with respect to a radius of the disc. It should also be noted that at 18A, 18B there can be seen passages which are formed in a blade 13 and which enable it to receive friction pads, which are commonly in the form of a continuous ring, on both sides of its faces, for example by riveting.

For a circumference corresponding to a given diameter, the terminal zone of that part of the blade 13 that is cantilevered to the greatest extent from the blade foot 14, and which is intersected by the endmost shoulder 53, is joined to the central portion 10 by means of a second foot 50, which will be generally called the reinforcing foot. In this example this second foot is in the same plane as the blade foot 14, since the said terminal zone concerned is a carrying zone 21A.

The second foot 50 is delimited by a slot 51, closed at its outer end, in the terminal zone 21A, and it extends radially. This slot 51 also passes through the offset junction zone 22. It too extends, partly, in a generally radial direction from the material which is present between the radial (or outer) end 55 of the slot furthest from the axis of the assembly, and the circumference of diameter C2. Since the foot 50 is joined to the central portion 10, the shape of the slot 51 is generally that of an inverted L extending from the foot 14 up to the outer end 55 of the slot.

The second foot 50 is thus attached to the outer periphery of the terminal zone 21A through a circumferentially orientated attachment portion 56, which prevents rupture of the end of the blade, expecially under the action of centrifugal force. In addition, the second foot is delimited by the appropriate circumferential enge 54 of the blade. In this example, this edge is orientated radially, with the slot 51 being partly parallel to the latter. It will be noted that the radial length of the reinforcing foot 50 is greater than that of the blade foot 14, and that it consists of a long strip of relatively thin material.

As will have been understood, by virtue of their junction zones 22 the blades allow a degree of resilient axial movement of their carrying zones to take place between an offset rest position, in which the friction pads are relatively spaced from each other, and a working or engagement position in which the friction pads have been moved towards each other.

It will be appreciated that the second foot 50 offers no hindrance to the movement of the pads while the slot 51 facilitates this movement while preserving good flexibility of the blade.

The present invention is of course not limited to the embodiments described. In particular, the terminal zone may extend substantially along a radius of the disc, as is described in FIG. 9 of the above mentioned patent FR 2 370 893B (GB 1 591 949A).

There may be any number of carrying zones 21A, 21B: for example the blade 13 may include, on one side of that zone 21A which is a continuation of the foot 14, only one zone 22, and on the other side a zone 22 and then a zone 21B constituting the terminal zone. The reinforcing foot 50 is then inclined, and may comprise two peripheral carrying zones connected together through an offset junction zone.

The reinforcing foot, having the form of a thin strip, may be disposed on the outside of the blade, in which case it can be connected to the outer periphery of the terminal zone and to the edge 54 through an attachment portion, axially orientated and identical to the attachment portion 56. In another modification, it may be disposed radially outside the circumference C2, in particular when the friction pads extend radially beyond the carrier disc, and may be connected to the outer peripheral edge of the blade concerned by means of a bent attachment portion, which may for example have the shape of an umbrella handle. This arrangement further improves the flexibility of the blade. The reinforcing foot may be either external to the blade or integral with the latter by means of a slot similar to the slot 51.

In all these arrangements, it is beneficial if the reinforcing foot, joined to the central portion, is delimited partly by a slot closed at its outer end and if it is parallel to the radial edge 54, with the latter delimiting the slot or the foot 50, according to whether the foot is external to, or partly integral with, the blade 13.

The reinforcing foot may be connected to the blade within its radial length or at its inner periphery. In that case, and referring to the drawing, the slot 51 may be shorter. and may not extend into the zone 21A, being then connected by a circumferential attachment portion 56, to the zone 22 at the inner periphery of the blade 13, this being the terminal zone furthest away from the blade foot 14.

In a modification, this zone 22 may be at the outer periphery of the blade 13, the blade having, for example, to one side of the foot 14 and its associated zone 21A, successively a zone 22, a zone 21B, and a zone 22 to which the foot 50 is connected through its attachment portion 56.

In all these cases it will be appreciated that the disc is manufactured simply by a pressing operation, without necessitating radical modifications to the tooling.

What is claimed is:

1. A friction pad carrier disc for a disc-type clutch for automotive vehicles, comprising a circumferentially generally continuous central portion, a peripheral portion comprising a series of radial blades surrounding the central portion, and a plurality of radial blade feet each joining a respective said blade individually to said central portion with the blade being cantilevered from its blade foot to define two circumferentially extending blade portions of unequal length extending on opposite sides of the blade foot, each blade having a plurality of transverse shoulders defining thereon a plurality of pad carrying zones alternating with junction zones, the carrying zones being generally parallel to the mean plane of said central portion and the junction zones being generally offset obliquely with respect to said plane, with an endmost said shoulder of each blade intersecting the longer one of its said blade portions, wherein, for an outer circumference of the blades corresponding to a given diameter, a terminal zone of each said longer blade portion is intersected by said endmost shoulder of the blade, the disc further comprising a plurality of reinforcing feet, each joining a respective said terminal zone to said central portion.

2. A disc according to claim 1, wherein said disc has a plurality of slots, each with an uninterrupted periphery and delimiting a respective one of said reinforcing feet.

3. A disc according to claim 2, wherein said disc further comprises a plurality of circumferentially oriented attachment portions, each joins a respective said reinforcing foot to the associated said terminal zone.

4. A disc according to claim 3, wherein each said slot intersects the associated said terminal zone, with the corresponding said attachment portion being delimited by the outer end of the slot.

5. A disc according to claim 4, wherein each reinforcing foot is delimited by the radial edge of the associated blade.

6. A disc according to claim 1, wherein each reinforcing foot extends radially in the same plane as the associated blade foot, the corresponding terminal zone is one of said carring zones which is generally parallel to the mean plane of the central portion.

7. A disc according to claim 1, wherein each reinforcing foot extends radially and comprises a long strip of thin material.

* * * * *